United States Patent

[11] 3,578,978

| [72] | Inventor | Bernard Laurent |
| | | Corenc-Montfleury, France |
| [21] | Appl. No. | 821,669 |
| [22] | Filed | May 5, 1969 |
| [45] | Patented | May 18, 1971 |
| [73] | Assignee | Cometa S. A. R. L. |
| | | Montfleury, France |

[54] OPTICAL PROJECTOR INCLUDING PHOTO-SENSITIVE DEVICE
5 Claims, 1 Drawing Fig.

[52] U.S. Cl. .................................................. 250/221,
250/216, 250/239
[51] Int. Cl. .................................................. G01p 3/68
[50] Field of Search .......................................... 250/216,
217, 221, 222, 239, 219 (ID), 219 (IDC); 350/194
(X); 356/209, 24, 4; 340/227

[56] References Cited
UNITED STATES PATENTS

| 3,263,087 | 7/1966 | Goldman et al. ............. | 250/216X |
| 3,334,236 | 8/1967 | Bacon ........................... | 250/217 |
| 3,390,388 | 6/1968 | Kahl, Jr. et al. ............... | 250/239X |
| 3,481,672 | 12/1969 | Zoot ............................ | 350/194X |

*Primary Examiner* — Walter Stolwein
*Attorney* — Holcombe, Wetherill and Brisebois

ABSTRACT: This invention relates to an optical projector for use in conjunction with a remote reflector which reflects a light beam from the projector. The projector may incorporate a photoelectric device for detecting variations in the light beam caused by movement of a body with respect to the light beam. The invention provides an optical projector comprising a light source and a lens which may be contained in a flat volume whose dimension in the direction of the optical axis is small with respect to the focal length of the lens.

Patented May 18, 1971 3,578,978
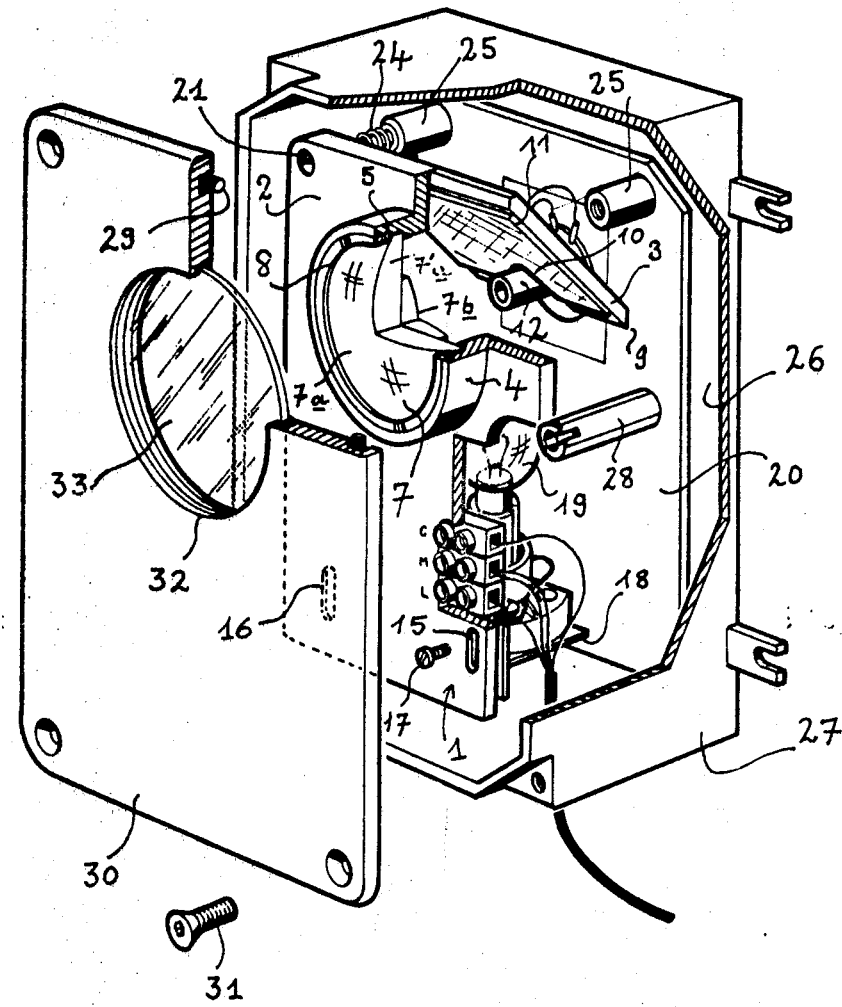

OPTICAL PROJECTOR INCLUDING PHOTO-SENSITIVE DEVICE

In various applications, more particularly in automatic control devices using the effect of the luminous screening of a body shifting across an optical ray, luminous projectors are used, with visible or nonvisible light, which are either of the type having the projector separate and spaced from a receiver, or of the type with a receiver incorporated in the projector; the projected beam being reflected in the same direction by a reflector placed at a distance.

In this second type of projector with a receiver incorporated, the projected beam is generally formed by the annular part of a composite lens formed from two coaxial lenses of different diameters, while the received beam is focused by the central part of the said composite lens. These known devices, and also those which are used in simple projectors, use rather complex optical arrangements, which require a relatively high number of optical components placed in various relative positions which necessitate some adjustment. It results therefrom that this type of apparatus is complex and liable to become out of adjustment.

The present invention has for an object to provide a projector apparatus, or projector-receiver, of simple conception from the optical point of view, using a limited number of optical components, whilst having relatively small overall dimensions which make it suitable in the majority of applications. Moreover in a particularly advantageous embodiment one can have only a single optical component which necessitates an arrangement adjusted in position.

According to a feature of the invention, the projector apparatus is characterized in that the light source is positioned laterally with respect to the optical axis of the lens and in that the rays from the light source are reflected by a plane mirror along the optical axis, so as to enable the whole of the apparatus to be contained in a flat volume, whose dimension in the direction of the optical axis is small with respect to the focal length of the lens. This arrangement has proved very satisfactory from the optical point of view (beams projected over several meters can be obtained), but also allows the depth of the apparatus to be limited to very small dimensions, usually to less than 5 centimeters. Thus a box incorporating this apparatus may be lodged without difficulty in the thickness of the usual partitions of buildings, which simplifies considerably the positioning and enables a suitable camouflage of the apparatus, if desired.

According to another feature of the invention, a one-piece support plate forms on the one hand, a mounting plate for the lens and a means for fixing the lamp support in its adjusted position; as well as on the other hand, an inclined support for supporting the mirror. It is this plate which is the direct support member for the optical components (lens, mirror), while it is sufficient to adjust the support for the light source on the said plate so that the device is in a position for functioning optically.

The invention will now be further described, by way of example, with reference to the accompanying drawing which shows an exploded perspective view of one embodiment of an apparatus according to the invention.

Referring to the drawing, the apparatus comprises a one-piece support plate 1, made from aluminum, and forming both a front plate 2, and a wall 3, extending rearwardly from the upper side of the plate 2 at an angle of 45° to this plate 2.

The front plate 2 comprises a large circular opening defined by an annular flange 4 protruding outwardly, and threaded at 5 as far as a shoulder which forms the stop for a composite lens 7, locked in position by a locking ring 8 screwed into the thread 5.

The rear wall 3 extends downwardly until its free lower edge 9 extends slightly past the axis of the flange 4. This wall has an elongated cutaway portion 10 which extends from the lower edge 9 and ends in a semicircle, centered on the axis of the flange 4. The rear wall 3 serves on the one hand as a support for a plane mirror 11, fixed by adhesion on the front surface of the wall 3, and on the other hand as a support for photoelectric component or receiver 12, in the form of a small cylinder the lateral surface of which is adhesively secured to the cutaway portion 10. The various dimensions of the wall 3 and of the cutaway portion 10 are determined so that once it has been fixed by adhesion, the photosensitive cylindrical component 12 is coaxial with the axis of the flange 4.

The front plate 2 comprises in its lower part two oblong slots 15 and 16 which extend parallel to each other and perpendicular to the upper common edge of the plate 2 and of the wall 3. Through these slots the fixing screws 17 engage a support 18 for a lamp 19, so that the adjustment in position of the lamp 19 with respect to the mirror 11 may be carried out easily. The screw heads 17 are embedded in the spotface of the slots 15 and 16.

The plate 1 is fixed to a back plate 20 by three screws one of which is shown at 21 extending through the front plate 2 and engaging with the interposition of a compression spring 24, in a threaded ferrule, of which two are visible at 25, integral with the back plate 20. This back plate 20 is fixed to a base 26 of a box 27 by two threaded nuts, of which one is visible at 28, each one engaging on a threaded pin integral with the base 26. The box 27 is closed in a sealed manner by means of a joint 29 and a cover 30; the latter being fixed by the screws 31. This cover 30 comprises a circular window 32 facing the lens 7 and containing a plane protection glass 33.

The composite lens 7 is itself formed from two planoconvex lenses 7a and 7b, of different diameters, cemented together along the common plane face, the lens with the smallest diameter 7b being the inner one. These lenses are selected, the one 7a to form a generally parallel luminous beam, but its part 7'a extending beyond the edge of the lens 7b, from the beam emitted by the lamp 19 and reflected by the plane mirror 11, whilst the central part of the composite lens 7 formed from the lens 7b and from the central part of the lens 7a makes a received luminous beam converge along the optical axis on to the photosensitive component 12.

The function of the apparatus thus requires that a projected luminous beam is reflected along the same optical axis by a reflector means situated at a distance and not shown, and this reflected beam is received by the photosensitive component which activates in its turn, usually by amplification means, any movement control device, or audible or visual alarm, or other means subjected to the intensity change of the photoelectric current, when the optical beam is intercepted by an object shifting transversely to the said beam, or conversely when an object, which usually intercepts the beam, extends from this latter.

The extreme simplicity of the projector-receiver apparatus described herein is apparent, the said apparatus is formed from the optical point of view from a single composite lens (7a, 7b,) and from a single plate mirror 11, over and above the light source 19 and the photoelectric component 12. The composite lens 7a, 7b is used advantageously to obtain a small focal distance, allowing the location of the photoelectric component 12 directly on the optical axis, at the region of the mirror 11, whose central area which is practically useless for forming the projected beam, is available to serve as a location for the photosensitive component. There exists therefore a particularly good arrangement of optical components, since one can obtain with a 4 watt lamp, the formation of a beam which may be projected to a distance of more than 4 meters, while allowing the reception at the place of the photoelectric component of a reflected beam of sufficient intensity. Such an arrangement, which is given herein by way of example, can be placed in a box whose depth along the optical axis does not exceed 4.4 centimeters, while the other dimensions are 10.8 and 7 centimeters.

Another advantage of the device described, is its simplicity and its robustness which results not only from the small number of optical components used but also from the method of assembly. Due to the one-piece support plate, the composite lens 7, the mirror 11 and the photosensitive component 12 are fixed in correct relative positions, without any adjustment operation and on a rigid, robust support. It is sufficient therefore, at the time of the assembly of the apparatus, to adjust in position the support 18 for the light source 19 and at the time of the actual installation of the apparatus, to adjust the orientation of the plate 1 by means of the screws 21, of which one is used for adjusting in the horizontal direction and the other in the vertical direction, the third being used as a pivot. It is noted that the support plate 1 which carries all the optical components is fixed by its back plate 20 in a nonmovable and nonadjustable position to the base 26 of the box, which in its turn may be fixed to a wall, with or without recessing. Instead of fixing the support plate in a box, it can be fixed directly to a suitable support. In fact the support plate with its optical components forms a self-contained unit capable in the case of deterioration from being immediately replaced by another unit.

The invention is not limited to the embodiments described and shown and numerous variations may be made. Thus, instead of placing the optical assembly in a box, one can use any other support, with or without a protective cover.

The invention also relates to a simple light projector from which the photosensitive component or receiver 12 is omitted which has, as regards the emission of the projected beam, the same characteristics as have been described for the overall apparatus; while a simple lens creating a parallel beam is placed in the mounting 4.

I claim:

1. An optical projector comprising a lens, a plane mirror, integral support means supporting said lens and mirror in a position in which said mirror lies on and is inclined with respect to the optical axis of said lens, a light source, means for adjustably mounting said light source on said support means laterally of said optical axis in a position such that light rays from said light source are reflected by said mirror through said lens, a back plate adapted to be fixed to a stationary object, means for adjustably fastening said integral support means to said back plate, said adjustable fastening means comprising adjustment means accessible from the side of said integral support means remote from said back plate when said support means is fastened thereto and a photosensitive device in said projector responsive to reflected light.

2. An optical projector as claimed in claim 1 said photosensitive device being on said optical axis on the same side of said lens as said lens as said mirror and in which said lens is a composite lens formed from two coaxial lenses of different diameters, each having a plane face, said coaxial lenses being cemented together along said plane faces, the outer annular part of said composite lens being adapted to form an emitted beam from light reflected to said outer part by said mirror, and the inner part of said composite lens being adapted to focus the light from said beam which is reflected back through said lens onto said photosensitive device.

3. An optical projector as claimed in claim 2 in which said photosensitive device is between the mirror and composite lens.

4. An optical projector as claimed in claim 2 in which said mirror is formed with a recess at said optical axis, and said photosensitive device is mounted in said recess directly on said integral support.

5. An optical projector comprising a lens, a plane mirror positioned on the optical axis of said lens and inclined with respect to said axis, a light source positioned laterally of said axis in a position such that light rays from said light source are reflected by said mirror through said lens, and a photosensitive device on said optical axis on the same side of said lens as said mirror, and in which said lens is a composite lens formed from two coaxial lenses of different diameters, each having a plane face, said coaxial lenses being cemented together along said plane faces, the outer annular part of the larger of said coaxial lenses being adapted to form an emitted beam from light reflected therethrough by said mirror, and the inner part of said composite lens being adapted to focus the light from said beam which is reflected back through said lens onto said photosensitive device.